R. N. EHRHART.
SYSTEM FOR REMOVING AIR AND GASES FROM WATER.
APPLICATION FILED JUNE 5, 1920.
1,401,100.
Patented Dec. 20, 1921.
3 SHEETS—SHEET 1.
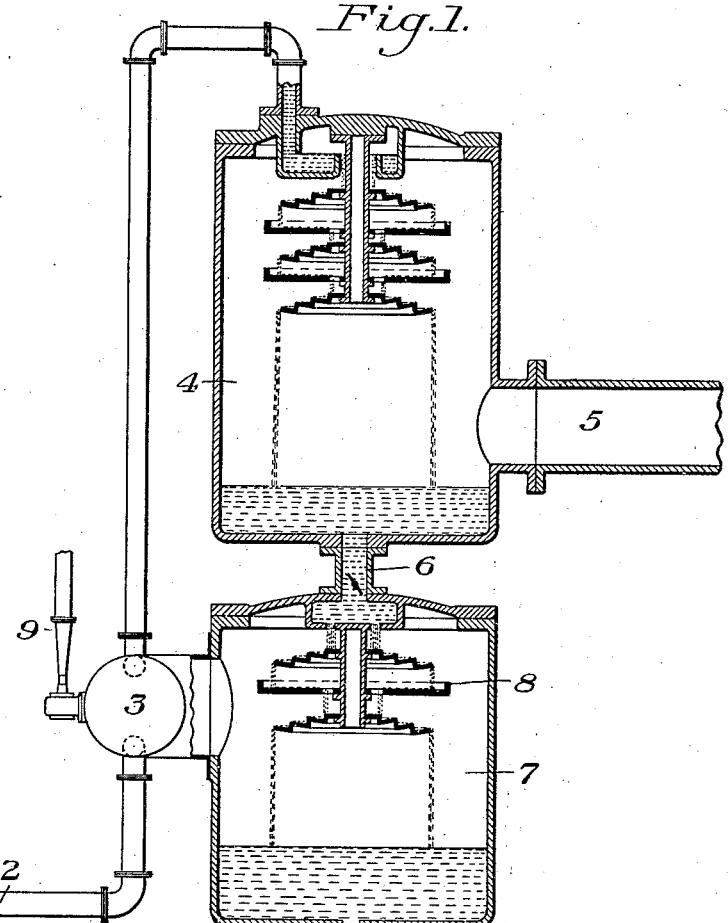
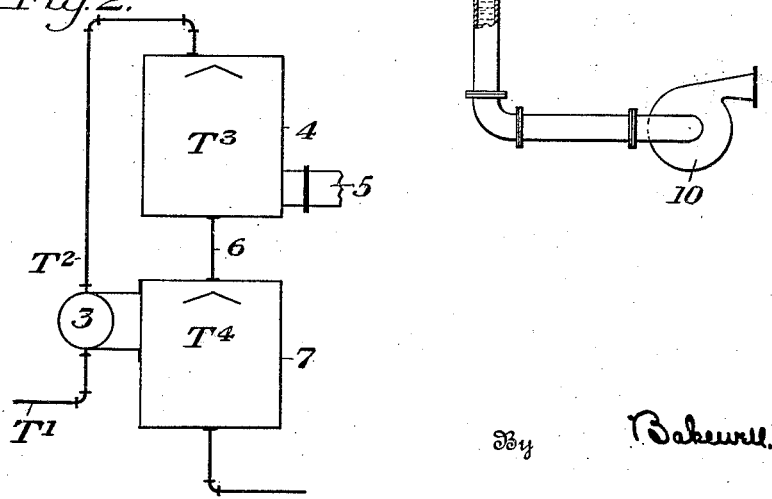

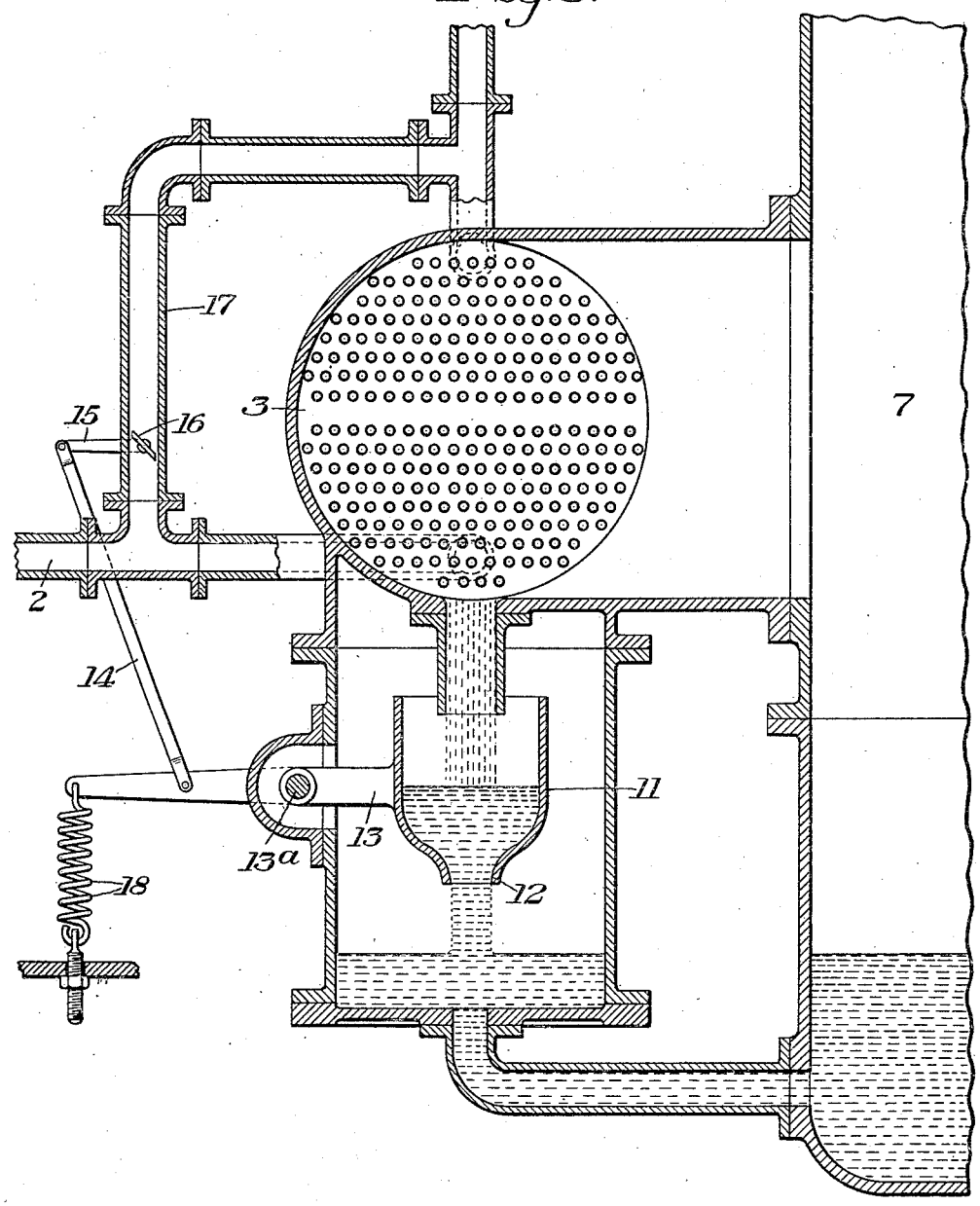

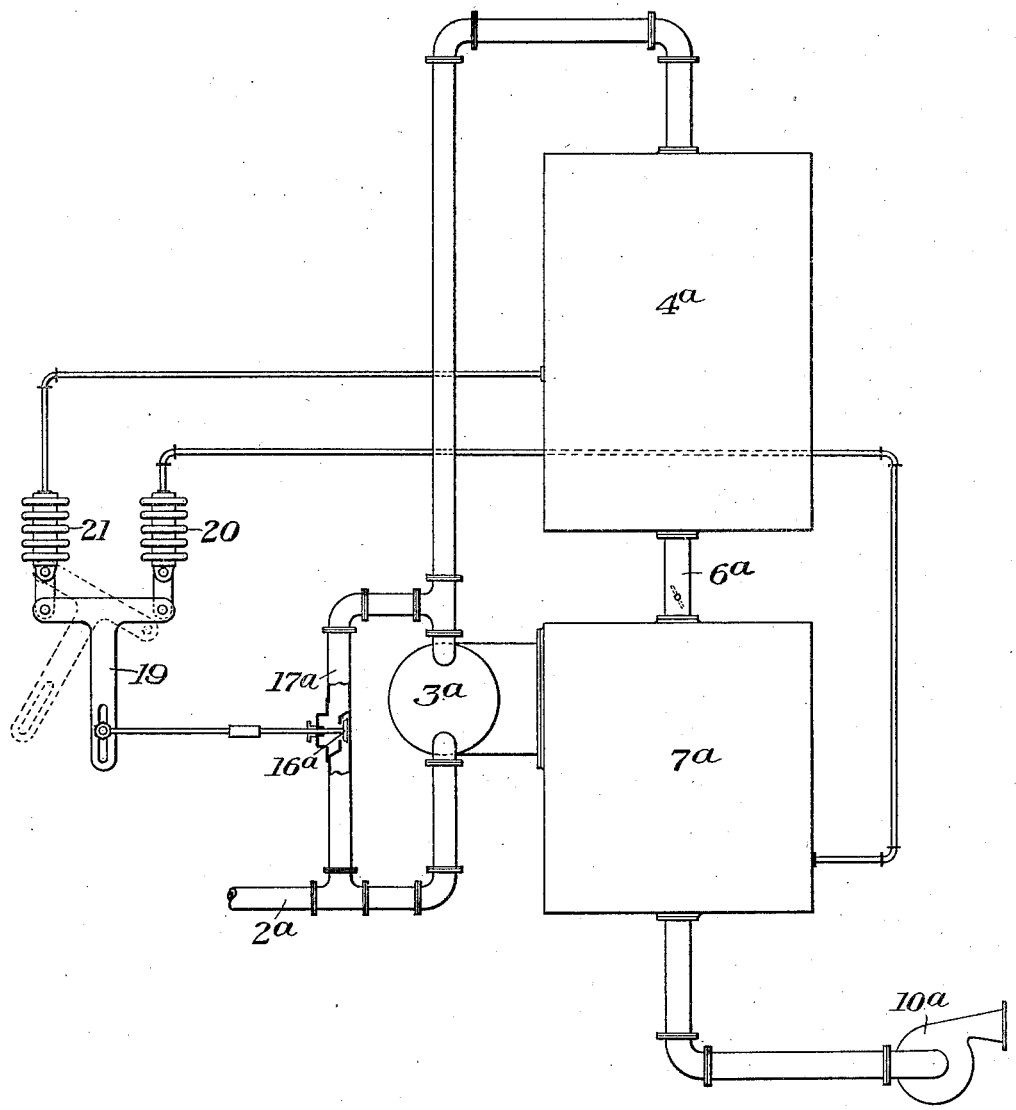

Se
UNITED STATES PATENT OFFICE.

RAYMOND N. EHRHART, OF PITTSBURGH, PENNSYLVANIA, ASSIGNOR TO ELLIOTT COMPANY, OF PITTSBURGH, PENNSYLVANIA, A CORPORATION OF PENNSYLVANIA.

SYSTEM FOR REMOVING AIR AND GASES FROM WATER.

1,401,100.   Specification of Letters Patent.   Patented Dec. 20, 1921.

Application filed June 5, 1920. Serial No. 386,833.

*To all whom it may concern:*

Be it known that I, RAYMOND N. EHRHART, a citizen of the United States, residing at Pittsburgh, Allegheny county, Pennsylvania, have invented a new and useful Improvement in Systems for Removing Air and Gases from Water, of which the following is a full, clear, and exact description, reference being had to the accompanying drawings, forming part of this specification, in which—

Figure 1 is a sectional elevation, largely diagrammatic, illustrating a type of apparatus in connection with which my invention is employed.

Fig. 2 is an illustrative diagram, Fig. 3 is a view similar to Fig. 1, and showing one form of apparatus embodying the invention, and Fig. 4 is a diagrammatic elevation illustrating another embodiment of the invention.

My invention has relation to systems for removing air and gases from water (the term "water" to be understood as including any liquid to which the invention may be applicable); and relates more particularly to systems of the general character described and claimed in a patent to William S. Elliott, No. 1,321,999, of November 18, 1919.

The apparatus of said patent is diagrammatically illustrated in Fig. 1. The water to be heated is admitted at 2 and passes through a tubular condenser 3 to the heater 4 in which it is heated by exhaust steam coming in through the connection 5. From the heater 4 the water flows through a connection 6 into an evaporator 7 provided with suitable distributers 8 to cause the water to flow into the evaporator in a cascade form. A pressure is maintained in the evaporator 7 which is materially lower than the pressure corresponding to the temperature of the water immediately before it enters the evaporator. The result is an explosive boiling of the water by which substantially all the air and gases are removed. The vapors and gases pass from the evaporator to the condenser 3, where the vapors are condensed and the air is withdrawn by any suitable means, such as the steam ejector 9. The air-free water collects at the bottom of the evaporator and is withdrawn by any suitable means, such as a pump 10, for use wherever desired.

The water in the evaporator 7, as it boils, has no outside source from which to receive heat for the boiling process. It, therefore, must supply heat from its own mass, which means that it drops in temperature to an extent corresponding to the drop in pressure. If the evaporated water is recondensed in the condenser 3, substantially the same amount of heat will be given to feed-water passing through the condenser and forming a condensing medium therefor as was abstracted from the water upon entering the evaporator, since the heat required to boil a certain quantity of liquid is equivalent to the heat liberated when the same amount of water is condensed.

As the same amount of water flows through the tubular condenser as is admitted into the evaporator; and since the condenser receives substantially the same amount of heat as is given up in the evaporator, the rise of temperature in the water going through the condenser must be equal to the fall of temperature of the water passing through the evaporator.

Referring to Fig. 2, $T_1$ designates the temperature of the water entering the system, $T_2$ the temperature of the water leaving the condenser 3, $T_3$ the temperature to which the water is raised in the heater 4, and $T_4$ the temperature to which the water drops in the evaporator 7; then $$T_2 - T_1 = T_3 - T_4 \quad (1)$$

By transposition:

$$T_3 = T_2 - T_1 + T_4 \quad (2)$$

If the condenser functions properly, it will heat the water going through it to substantially the temperature of the vapors being condensed. Therefore, $$T_2 = T_4 \quad (3)$$

If I substitute the equivalent value $T_2$ for $T_4$ in equation (2), I get $$T_3 = T_2 - T_1 + T_2 \quad (4)$$
$$T_3 = 2T_2 - T_1$$

Subtracting $T_1$ from each side of equation (4)

$$T_3 - T_1 = 2T_2 - 2T_1$$
$$T_3 - T_1 = 2(T_2 - T_1) \quad (5)$$

In other words, the rise in temperature above that of the water supplied is twice as great in the heater as through the condenser.

If the flow of water through the system is diminished while the amount of exhaust steam going into the heater is kept constant, it will be apparent that the rise in temperature of the water going through the condenser will be materially increased, since the heat-absorbing capacity of the condenser is relatively constant. Thus, if the volume of water be reduced one-half the rise in temperature through the condenser will be doubled; and the total rise from $T_1$ to $T_3$ in the heater, will be quadrupled. That is to say, with a diminished water supply, the heater temperature increases very rapidly.

Under certain conditions, it is desirable to keep the temperature from rising above certain predetermined limits. For example, in power plants, it is frequently undesirable to have the auxiliary machinery exhaust above a certain pressure. As the pressure in the heater will always be at least that corresponding to the water temperature therein, it is apparent that a high temperature in the heater will be co-incident with a high pressure. By limiting the amount of steam condensed in the condenser, or, correspondingly, that evaporated in the evaporator, I can control the rise in temperature in the condenser within certain limits. It has also been found that a relatively constant drop in temperature in the evaporator, irrespective of the amount of water or steam supply, is conducive to good results. If the steam supply is constant, a constant drop in temperature in the evaporator means a practically constant rise of temperature in the condenser, since, in the operation there is abstracted a certain amount of heat from the water in the evaporator, while substantially the same amount of heat is returned to the water in the condenser.

My invention is designed to provide for controlling the amount of heat abstracted from the water in the evaporator and the corresponding addition in the condenser in order to keep the temperature within certain limits.

By lowering the heat-absorbing ability of the condenser, that is, by depreciating its performance, I can readily control the amount of vapors condensed therein. This may be done either by cutting down the supply of water fed to the condenser, or by various other means well known to those skilled in the condenser art. For instance, if the piping is so arranged as to bypass a certain portion of the cooling water which would otherwise normally pass to the condenser, the condensing capacity of the latter may be decreased or increased, at will.

One method of accomplishing this result is shown in Fig. 3. In this figure I have given the same reference numerals in so far as applicable as those given to the corresponding parts in Fig. 1.

11 designates a vessel which is designed to catch the condensed steam from the condenser 3. This vessel is provided with a suitable orifice 12 at its bottom which will allow the water to escape, but which will maintain different levels as the amount of condensing water varies. The weight of the vessel and its contained liquid will then be a function of the volume of steam condensed. This vessel 11 is carried by one arm of a lever 13 fulcrumed at 13$^a$. The other arm of this lever has an actuating connection 14 with a lever arm 15 of a valve 16 which is placed in the bypass 17 of the feed-water supply pipe 2, this bypass shunting the condenser 3. 18 is an adjustable spring connected to the lever 12.

As the condensation increases, the vessel 11 tends to fill the water and tends to open the bypass. This, in turn, decreases the condensing capacity of the condenser, since less feed-water passes therethrough. By means of the spring 18, the parts may be adjusted for any desired rate of condensation.

The amount of water passing through the condenser may also be regulated by taking advantage of the drop in temperature in the evaporator, this drop being also proportional to the amount of steam which is condensed in the condenser. Apparatus for this purpose is shown diagrammatically in Fig. 4. In this figure, the parts corresponding to those shown in Figs. 1 and 3 are given the same reference numerals with the letter "a" affixed thereto. In this figure the bypass valve 16$^a$ has its stem adjustably connected to one arm of a three-armed lever 19. Connected to each of the other arms of this lever is a thermostatic device 20 or 21 which may comprise diaphragm members filled with ethyl chlorid or other like fluids which expand with considerable force under increasing temperatures. The member 21 is connected to the heater 4$^a$, while the member 20 is connected to the evaporator 7$^a$. So long as the devices 20 and 21 distend or contract equally there will be no movement of the valve 16; but if there is unequal distention or contraction of these members, the valve 16 will be opened or closed accordingly. These members may be so adjusted that a given temperature difference between the heater and the evaporator will open or close the valve. For example, I may so adjust them that complete bypassing of the condenser will be complete with say 25 degrees difference in temperature between the evaporator and the heater; or the valve 16 may be fully closed at, say 20 degrees drop in temperature between the evaporator and the heater. In this manner I can control the condensing capacity of the condenser so as to keep the temperature difference between the heater and the evaporator within a limit of from 20 to 25 degrees F., which is sufficient for all practical purposes.

It will be readily understood that the means which I have shown are illustrative only and that various other means may be employed whereby to control the temperature difference between the heater and the evaporator.

I claim:

1. In a system for removing air and other dissolved gases from liquids in which the liquid is introduced into an evaporator having a pressure which is definitely lower than the pressure corresponding to the temperature of the liquid immediately prior to its introduction into the evaporator and is thereby caused to evaporate under the action of its contained heat, the method which consists in passing the vapor and gases from the evaporating chamber through a condenser and continuously regulating the rate of condensation in the condenser to thereby control within predetermined limits the amount of heat given up by the liquid in the evaporator, substantially as described.

2. In a system for removing air and other dissolved gases from liquids in which the liquid is introduced into an evaporator having a pressure which is definitely lower than the pressure corresponding to the temperature of the liquid immediately prior to its introduction into the evaporator and is thereby caused to evaporate under the action of its contained heat, the method which consists in passing the vapor and gases from the evaporating chamber through a condenser and in regulating the supply of cooling water to the condenser to thereby control the rate of condensation in the condenser, substantially as described.

3. In a sytem for removing air and other dissolved gases from liquids in which the liquid is introduced into an evaporator having a pressure which is definitely lower than the pressure corresponding to the temperature of the liquid immediately prior to its introduction into the evaporator and is thereby caused to separate under the action of its contained heat, the method which consists in passing the vapor and gases from the evaporator chamber through a condenser and utilizing the changes which take place in the conditions in the system to automatically vary the supply of cooling water to the condenser to thereby control the rate of condensation in the condenser, substantially as described.

4. In a system of the character described, the combination of an evaporator, means for supplying a heated liquid thereto, means for maintaining in the evaporator a pressure lower than the pressure corresponding to the temperature of the liquid before it enters the evaporator, and means for controlling the action of the condenser to thereby control the amount of heat given up by the liquid in the evaporator, substantially as described.

5. In a system of the character described, the combination of an evaporator, means for supplying a heated liquid thereto, means for maintaining in the evaporator a pressure lower than the pressure corresponding to the temperature of the liquid before it enters the evaporator, and means for automatically controlling the amount of heat given up by the liquid in the evaporator within definite predetermined limits, substantially as described.

6. In a system of the character described, apparatus comprising a heater, an evaporator connected to the heater to receive heated liquid therefrom, a condenser connected to the evaporator, a supply connection for cooling water for the condenser, and means for automatically controlling such supply to thereby vary the rate of condensation in the condenser within predetermined limits and under predetermined conditions, substantially as described.

7. In a system of the character described, apparatus comprising a heater, an evaporator connected to the heater to receive heated liquid therefrom, a condenser connected to the evaporator, means for supplying cooling water to the condenser, a connection between the condenser and the heater for carrying the cooling water to the heater after it has passed through a condenser, and means whereby the amount of water flowing through the condenser is automatically varied within predetermined limits under predetermined conditions, substantially as described.

In testimony whereof, I have hereunto set my hand.

RAYMOND N. EHRHART.